US009278709B2

(12) United States Patent
Champagne et al.

(10) Patent No.: US 9,278,709 B2
(45) Date of Patent: Mar. 8, 2016

(54) STEERING SYSTEM HAVING COMPENSATION COMMAND CALIBRATION

(75) Inventors: Anthony J. Champagne, Saginaw, MI (US); Jeffrey R. Meyer, Munger, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 247 days.

(21) Appl. No.: 13/536,024

(22) Filed: Jun. 28, 2012

(65) Prior Publication Data

US 2013/0151078 A1 Jun. 13, 2013

Related U.S. Application Data

(60) Provisional application No. 61/569,602, filed on Dec. 12, 2011.

(51) Int. Cl.
*B62D 5/04* (2006.01)

(52) U.S. Cl.
CPC ............ *B62D 5/0472* (2013.01); *B62D 5/0463* (2013.01)

(58) Field of Classification Search
CPC .......... B62D 5/00; B62D 5/005; B62D 5/006; B62D 5/04; B62D 5/0463; B62D 5/0466; B62D 5/0457; B62D 5/046; B62D 5/0472
USPC ........ 318/432–433; 701/41–44; 180/6.2, 234, 180/408, 412–413; 280/5.51, 221
See application file for complete search history.

(56) References Cited

U.S. PATENT DOCUMENTS

| | | | | |
|---|---|---|---|---|
| 2003/0150366 A1* | 8/2003 | Kaufmann et al. | ..... | 114/144 RE |
| 2004/0099469 A1* | 5/2004 | Koibuchi et al. | .............. | 180/421 |
| 2004/0189228 A1 | 9/2004 | Katch et al. | | |
| 2008/0027609 A1* | 1/2008 | Aoki et al. | ...................... | 701/43 |
| 2009/0069981 A1* | 3/2009 | Barthomeuf et al. | ........... | 701/42 |
| 2010/0004824 A1* | 1/2010 | Ikeda et al. | ..................... | 701/42 |
| 2010/0292896 A1* | 11/2010 | Watanabe et al. | ............... | 701/41 |

FOREIGN PATENT DOCUMENTS

| | | |
|---|---|---|
| CN | 1903633 A | 1/2007 |
| CN | 101395056 A | 3/2009 |
| EP | 2289767 A2 | 2/2011 |
| JP | 2010101746 A | 5/2010 |

OTHER PUBLICATIONS

European Search Report for EP Application No. 12196797.0, dated Jun. 7, 2013, 7 pages.
Chinese Office Action issued Feb. 2, 2015 in corresponding CN Application No. 201210597122.4.

* cited by examiner

*Primary Examiner* — Khoi Tran
*Assistant Examiner* — Abby Lin
(74) *Attorney, Agent, or Firm* — Cantor Colburn LLP

(57) ABSTRACT

A control system for a power steering system is provided. The control system includes an amplitude calculation module and a command module. The amplitude calculation module receives a compensation command. The amplitude calculation module determines a command amplitude that is based on the compensation command. The command module generates a command to the power steering system. The command is based on the command amplitude.

18 Claims, 4 Drawing Sheets

STEERING SYSTEM HAVING COMPENSATION COMMAND CALIBRATION

CROSS-REFERENCES TO RELATED APPLICATIONS

This patent application claims priority to U.S. Provisional Patent Application Ser. No. 61/569,602 filed Dec. 12, 2011 which is hereby incorporated herein by reference in its entirety.

BACKGROUND OF THE INVENTION

The present invention relates to methods and systems of a power steering system, and more particularly to methods and system for calculating a command signal for a power steering system.

Electric power steering systems may be tuned for steering feel during product development. Steering feel may be based on a given set of operating conditions. However, an inconsistent steering feel may be created in some circumstances such as, for example, external disturbances, variations in different products, and driving conditions. Specifically, in one example, a compensation command is included as part of a signal that the electric power steering system monitors, where the compensation command may alter the steering feel. The compensation command typically acts to reject some types of disturbances or to compensate for some types of issues that may occur in the electric power steering system. One example of a compensation command includes rejecting a portion of the effects of road wheel imbalance.

SUMMARY OF THE INVENTION

According to one aspect of the invention, a control system for a power steering system is provided. The control system includes an amplitude calculation module and a command module. The amplitude calculation module receives a compensation command. The amplitude calculation module determines a command amplitude that is based on the compensation command. The command module generates a command to the power steering system. The command is based on the command amplitude According to another aspect of the invention, a control control system for a power steering system is provided. The control system includes an amplitude calculation module, an assist value module and a command module. The amplitude calculation module receives a compensation command. The amplitude calculation module determines a command amplitude based on the compensation command. The assist value module receives the command amplitude and determines an assist value based on the command amplitude. The command module generates a command to the power steering system. The command is based on the command amplitude and the assist value.

According to yet another aspect of the invention, a method of controlling a power steering system is provided. The method includes determining a command amplitude based on a compensation command. The method includes determining an assist value based on the command amplitude. The method includes generating a command to the power steering system, the command based in on the command amplitude and the assist value.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
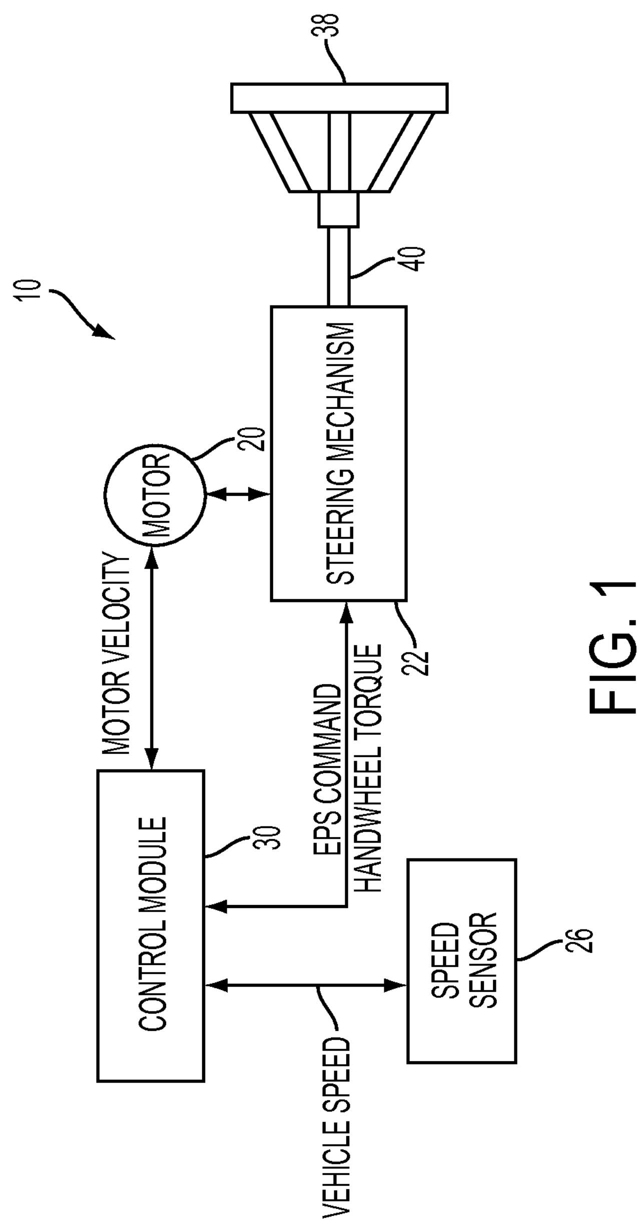
FIG. 1 is a block diagram of an electric power steering control system in accordance with an exemplary embodiment of the invention.

Referring now to the Figures, where the invention will be described with reference to specific embodiments, without limiting same, FIG. 1 is a schematic illustration of an exemplary power electric steering system 10. The power steering system 10 includes a motor 20, a steering mechanism 22, a speed sensor 26, and a control module 30. In the embodiment as shown in FIG. 1, the control module 30 is in communication with the motor 20, the steering mechanism 22, and the speed sensor 26. The motor 20 is an electric motor for providing torque assist to the steering mechanism 22. The steering mechanism 22 may include a handwheel 38 that is coupled to an upper steering shaft 40. In one embodiment, the power steering system 10 may be part of a vehicle (not shown) where the speed sensor 26 indicates the speed of the vehicle. For example, in one embodiment, the speed sensor 26 determines the rotational speed of a driveshaft (not shown), where a transmission (not shown) transfers engine torque to the driveshaft which drives the wheels of the vehicle. The control module 30 is in communication with the motor 20, the steering mechanism 22, and the speed sensor 26.

Figure 2:
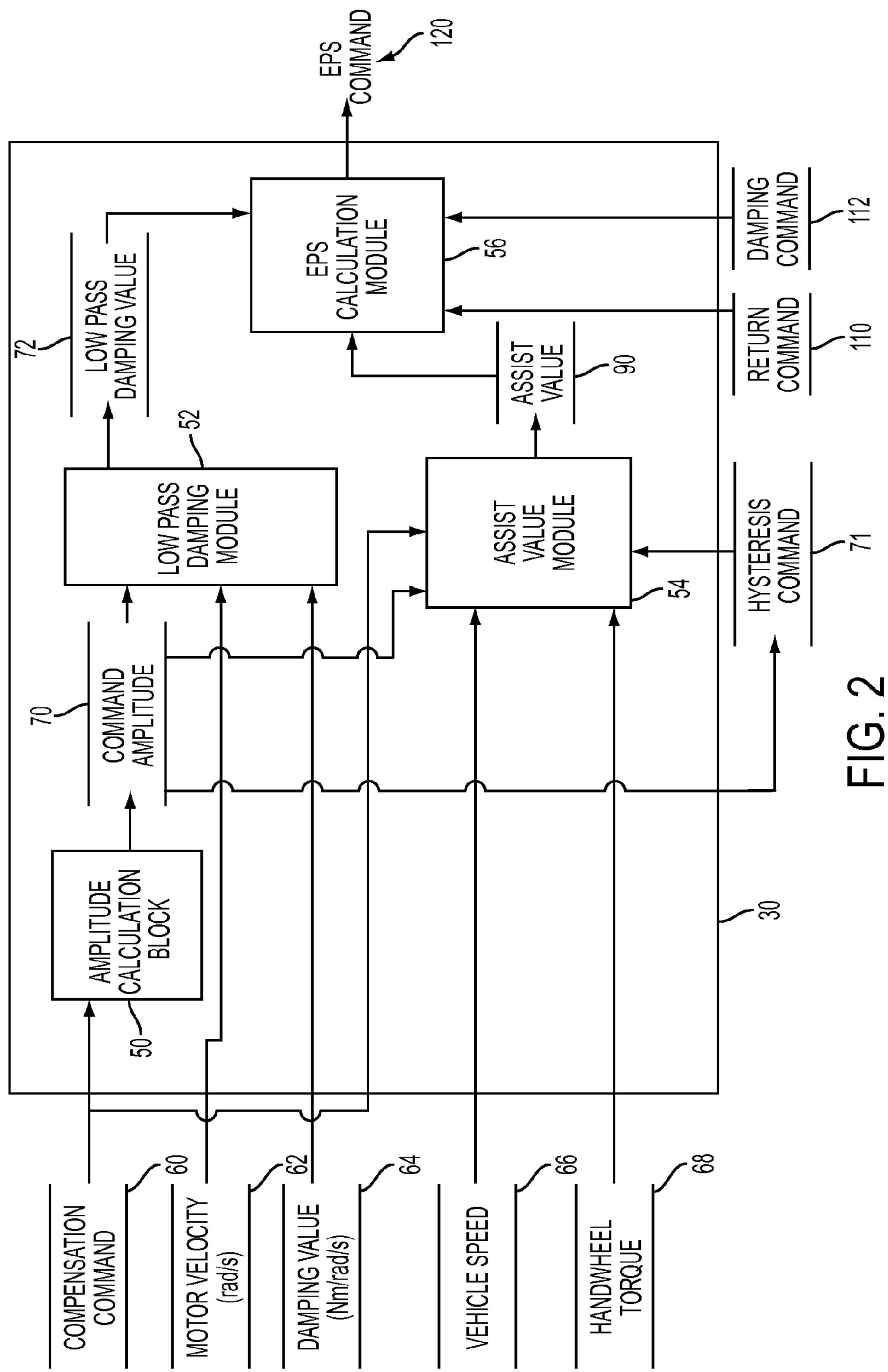
FIG. 2 is a dataflow diagram illustrating the electric power steering control system in accordance with another exemplary embodiment of the invention.

The control module 30 controls the operation of the power steering system 10. Referring now to FIG. 2, a dataflow diagram illustrates an exemplary embodiment of the control module 30 of FIG. 1 used to control the power steering system 10 of FIG. 1. In various embodiments, the control module 30 may include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly control road wheel disturbance at the handwheel based on wheel speed signals. Inputs to the control module 30 may be generated from the motor 20, the steering mechanism 22, the speed sensor 26, from other control modules (not shown), may be modeled, and/or may be predefined.

The control module 30 includes an amplitude calculation module 50, a low pass damping module 52, an assist value module 54, and an electric power steering (EPS) calculation module 56. The inputs into the control module 30 include a compensation command 60, a motor velocity 62 of the motor 20 (measured in red/sec), a damping value 64 measured in Nm/rad/s, a vehicle speed 66 as measured by the speed sensor 26 (shown in FIG. 1), and a handwheel torque 68 of the handwheel 38 (shown in FIG. 1). The damping value 64 is generally a motor velocity damping scale factor.

Figure 3:
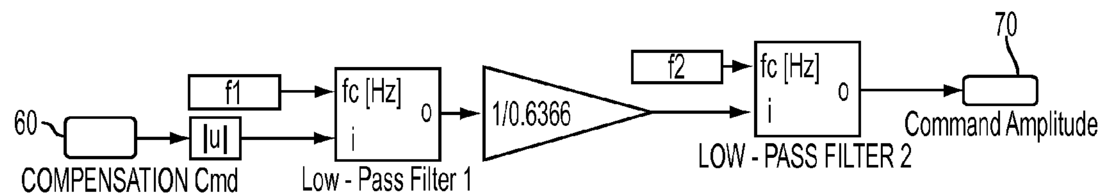
FIG. 3 illustrates an exemplary approach for calculating a command amplitude in accordance with an exemplary embodiment of the invention.

In one embodiment, the compensation command 60 may be a generally sinusoidal signal. The compensation command 60 may be used to alter the feel of the handwheel 38. The amplitude calculation module 50 calculates a command amplitude 70 (e.g., the amplitude) of the compensation command 60. FIG. 3 is an exemplary illustration of one approach for calculating the command amplitude 70. In the embodiment as shown in FIG. 3, an absolute value of the compensation command 60 is calculated, and is then fed through a first low pass filter (indicated as Low Pass Filter 1) and a second low pass filter (indicated as Low Pass Filter 2), which in turn provides the command amplitude 70. It is understood that FIG. 3 is an illustrative embodiment and that various other approaches may be used as well to calculate the command amplitude 70. The command amplitude 70 is an input to the low pass damping module 52, the assist value module 54, and a hysteresis command 71.

Figure 4:
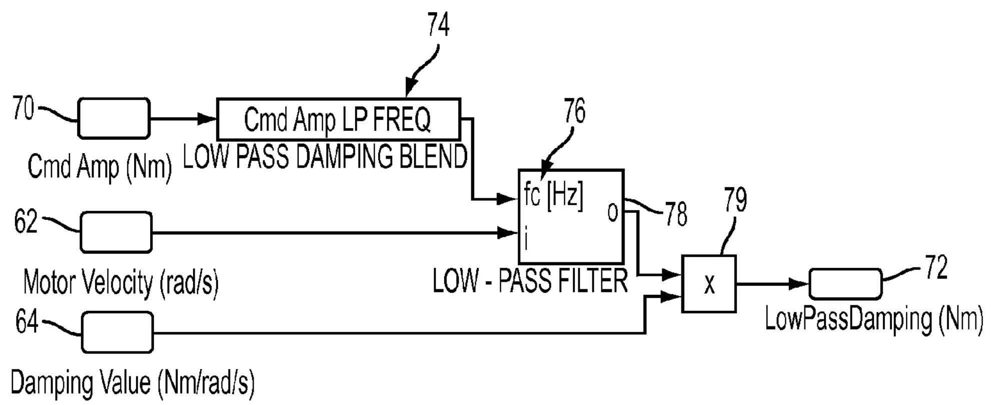
FIG. 4 illustrates an exemplary approach for calculating a low pass damping value in accordance with an exemplary embodiment of the invention.

Referring back to FIG. 2, the command amplitude 70, the motor velocity 62, and the damping value 64 are inputs into the low pass damping module 52. The low pass damping module 52 calculates a low pass damping value 72, which is measured in Nm. FIG. 4 is an exemplary illustration of one approach to calculate the low pass damping value 72. The command amplitude 70 is inputted into a low pass damping blend block 74 (which is illustrated in greater detail in FIG. 5) to calculate the low pass cutoff frequency value 76, which is measured in Hertz. The low pass cutoff frequency value 76 and the motor velocity 62 are inputted into a low pass filter 78. An output of the low pass filter 78 and the damping value 64 are inputted into a multiplier 79, which calculates the low pass damping value 72.

Figure 5:
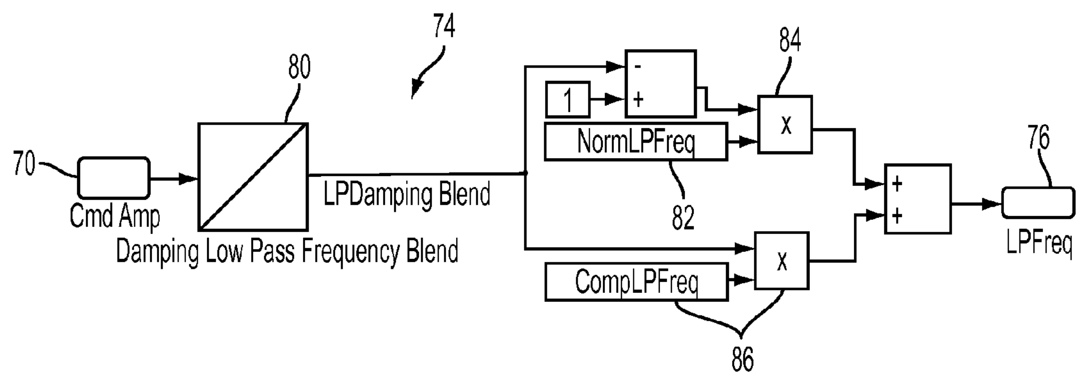
FIG. 5 illustrates an exemplary low pass damping blend block in accordance with an exemplary embodiment of the invention.

FIG. 5 is an exemplary illustration of the low pass damping blend block 74 to calculate the low pass cutoff frequency value 76 illustrated in FIG. 4. In the embodiment as shown in FIG. 5, the command amplitude 70 is inputted into a lookup table 80. The lookup table 80 maps the command amplitude 70 to a blend value, which is illustrated as a low pass damping blend value. In one exemplary embodiment, the low pass damping blend value is generally a value ranging between 0 and 1. The low pass damping blend value is blended with a normal filter cutoff frequency value 82. The low pass blend value is blended with a compensation command value 86. The values in blocks 84 and 88 are then combined together to create the low pass cutoff frequency value 76.

Referring back to FIG. 2, the compensation command value 60, the vehicle speed 66, the hysteresis command 71, and the handwheel torque 68 are inputs to the assist value module 54. The assist value module 54 calculates an assist value 90 (also shown in FIG. 6), which is measured in Nm.

Figure 6:
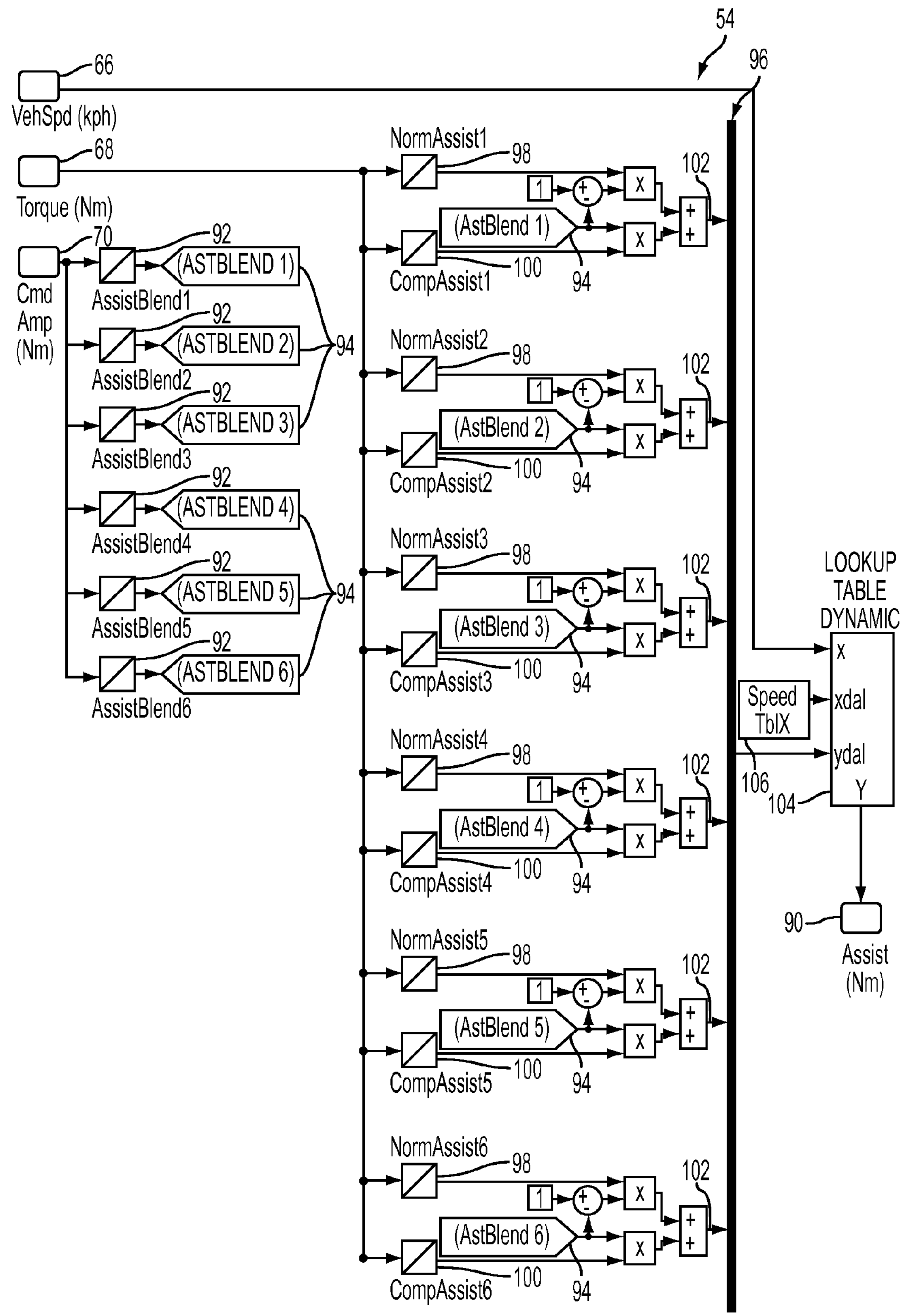
FIG. 6 illustrates an exemplary approach for calculating an assist value in accordance with yet another exemplary embodiment of the invention.

FIG. 6 is an exemplary illustration of one approach for calculating the assist value 90 by the assist value module 54. The assist value module 54 (shown in FIG. 2) includes a plurality of compensation blending tables 92. The command amplitude 70 is sent to one of the compensation blending tables 92. Specifically, based on the value of the command amplitude 70, the command amplitude 70 is sent to one of the compensation blending tables 92 (e.g., where the command amplitude 70 is sent to the compensation blending table labeled 'Assist Blend 1' for the relatively lowest values, and the command amplitude 70 is sent to the compensation blending table labeled 'Assist Blend 6' for the relatively highest values). The compensation blending tables 92 each create a corresponding blend value 94. In the exemplary embodiment as shown in FIG. 6, six blending tables 92 and six corresponding blend values 94 are illustrated, however any number of blending tables 92 may be used as well.

The assist value module 54 also includes an assist calculation block 96. A plurality of assist tables 98 are provided for normal steering assist to a driver (e.g., where there is no compensation provided), as well as a plurality of compensation assist tables 100 (which are used for full compensation). Each compensation table 100 corresponds to a specific vehicle speed (e.g., where the compensation table 100 labeled 'CompAssist 1' corresponds to the relatively lowest vehicle speeds, and the compensation table 100 labeled 'CompAssist 6' corresponds to the relatively highest vehicle speeds). Values for the compensation assist tables 100 are developed in the event a relatively large compensation command 60 is provided. In the exemplary embodiment as shown, six normal assist tables 98 and six compensation assist tables 100 are provided, however any number of normal assist tables 98 and compensation assist tables 100 may be provided as well. A value from the normal assist tables 98 and a value from the compensation assist tables 100 are selected based on the handwheel torque 68. The corresponding blend values 94 are combined with the values from the normal assist tables 98 and the compensation assist tables 100 to create values 102. The values 102 are sent to a lookup table dynamic block 104.

The lookup table dynamic block 104 receives as inputs the vehicle speed 66, a calibration speed table 106, and the values 102. The lookup table dynamic block 104 interpolates between the different values 102 sent to the lookup table dynamic block 104 based on the vehicle speed 66 to generate the assist value 90.

Referring back to FIG. 2, the assist value 90, the low pass damping value 72, a return command 110, and a damping command 112 are each sent to the EPS calculation module 56. The return command 110 is used as an aid in returning the handwheel 38 (shown in FIG. 1) to an on-center position after a turn, and the damping command 112 is a high-pass filtered version of the motor velocity 62 to provide high-frequency disturbance rejection.

The EPS calculation module 56 then calculates an EPS command value 120 as an output to the motor 20 of the power steering system 10 (shown in FIG. 1). It should be noted that while FIG. 2 illustrates the assist value 90 and the low pass damping value 72 being sent to the EPS calculation module 56, it should be noted that the EPS command value 120 may be based on other variables as well such as, for example, a damping high-pass filter frequency, an assist low-pass filter frequency, a frequency dependent damping table, a hysteresis compensation value, a low-pass assist value, and a high-pass gain. It should be noted that the variables may be a single value, a table, or multiple tables intended for various vehicle speeds. The EPS command value 120 generally provides an improved steering feel when compared to a current EPS command value available that utilizes a compensation command. Specifically, the EPS command value 120 may provide an improved consistency in steering feel. This is because the control module 30 monitors the amplitude of the compensation command 60, and blends parameters such as, for example, vehicle speed to provide a relatively consistent steering feel when the compensation command 60 is employed.

It should be noted that the examples as illustrated in FIGS. 3-6 illustrate specific blending approaches, and a variety of different blending techniques may be implemented by the control module 30 as well. Moreover, referring generally to FIG. 6, in the event multiple tables such as, for example, the normal assist tables 98 and the compensation assist tables 100 are employed, any combination of the normal assist tables 98 and the compensation assist tables 100 may be employed. For example, the first two sets of normal assist tables 98 and compensation assist tables 100 may be omitted from blending. This is because the first two sets of normal assist tables 98 and compensation assist tables 100 generally correspond with relatively low vehicle speeds, where steering feel is usually not a consideration.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for a power steering system, comprising:

an amplitude calculation module that receives a sinusoidal compensation command signal, the compensation command signal compensates for a change in torque at a handwheel of the power steering system due to at least a road wheel imbalance, the amplitude calculation module determining a command amplitude signal based on the compensation command signal, the command amplitude signal is a value representing an amplitude of the compensation command signal;

an assist value module that receives the command amplitude signal and determines a corresponding blend value based on the command amplitude signal; and a command module that generates a command signal to further compensate the power steering system and controls a motor of the power steering system according to the command signal, the command signal based on the command amplitude signal and the blend value.

2. The control system as recited in claim 1, wherein the assist value module includes an assist calculation block that includes a plurality of compensation assist tables that each correspond to a specific vehicle speed.

3. The control system as recited in claim 2, wherein the assist value module determines an assist value based on a set of values, the set of values is selected from the plurality of compensation assist tables that are used with compensation, a plurality of normal assist tables that are used when no compensation is present, and a vehicle speed.

4. The control system as recited in claim 3, wherein the assist value is sent to the command module, and wherein the command signal is further based on the assist value.

5. The control system as recited in claim 1, wherein the command amplitude signal is calculated by determining an absolute value of the compensation command signal, and is then sent to a first low pass filter and a second low pass filter.

6. The control system as recited in claim 1, comprising a low pass damping module that determines a low pass damping value that is sent to the command module, wherein the low pass damping value is based on the command amplitude signal.

7. The control system as recited in claim 6, wherein the low pass damping value is based on a motor velocity and a damping value.

8. The control system as recited in claim 6, wherein the low pass damping value is calculated by inputting the command amplitude signal to a damping blend block.

9. The control system as recited in claim 1, wherein the command signal is based on a return command and a damping command signal.

10. A control system for a power steering system, comprising:

an amplitude calculation module that receives a sinusoidal compensation command signal, the compensation command signal compensates for a change in torque at a handwheel of the power steering system due to at least a road wheel imbalance, the amplitude calculation module determining a command amplitude signal based on the compensation command signal, the command amplitude signal is a value representing an amplitude of the compensation command signal;

an assist value module that receives the command amplitude signal and determines an assist value based on the command amplitude signal; and a command module that generates a command signal to further compensate the power steering system and controls a motor of the power steering system according to the command signal, the command signal based on the command amplitude signal and the assist value.

11. The control system as recited in claim 10, wherein the assist value module includes an assist calculation block that includes a plurality of compensation assist tables that each correspond to a specific vehicle speed.

12. The control system as recited in claim 11, wherein the assist value module determines the assist value based on a set of values, the set of values is selected from the plurality of compensation assist tables that are used with compensation, a plurality of normal assist tables that are used when no compensation is present, and a vehicle speed.

13. The control system as recited in claim 12, wherein the assist value is sent to the command module, and wherein the command signal is based on the assist value.

14. The control system as recited in claim 10, wherein the command amplitude signal is calculated by determining an absolute value of the compensation command signal, and is then sent to a first low pass filter and a second low pass filter.

15. The control system as recited in claim 10, comprising a low pass damping module that determines a low pass damping value that is sent to the command module, wherein the low pass damping value is based on the command amplitude signal.

16. A method of controlling a power steering system, comprising:

determining a command amplitude signal based on a sinusoidal compensation command signal, the compensation command signal compensates for a change in torque at a handwheel of the power steering system due to at least a road wheel imbalance;

determining an assist value signal based on the command amplitude signal, the command amplitude signal is a value representing an amplitude of the compensation command signal;

generating a command signal to further compensate the power steering system, the command signal based on the command amplitude signal and the assist value signal; and controlling a motor of the power steering system according to the command signal.

17. The method as recited in claim 16, comprising determining the assist value signal based on a plurality of compensation assist tables that are used with compensation, a plurality of normal assist tables that are used when no compensation is present, and a vehicle speed, wherein the plurality of compensation assist tables that each correspond to a specific vehicle speed.

18. The method as recited in claim 16, comprising determining the command amplitude signal by calculating absolute value of the compensation command signal, and is then sent to a first low pass filter and a second low pass filter.

* * * * *